United States Patent
Galusha et al.

[11] 3,958,052
[45] May 18, 1976

[54] SUBSURFACE-FORTIFIED GLASS LAMINATES

[75] Inventors: Richard E. Galusha; William T. Kane, both of Big Flats; John E. Megles, Jr., Corning; Joseph M. Williams, Horseheads, all of N.Y.

[73] Assignee: Corning Glass Works, Corning, N.Y.

[22] Filed: June 12, 1974

[21] Appl. No.: 478,584

[52] U.S. Cl. ................................. 428/68; 156/99; 428/215; 428/410
[51] Int. Cl.² .................. B32B 7/02; C03C 17/02
[58] Field of Search .............. 161/165, 193; 65/121; 156/99; 428/68, 76, 215, 410

[56] References Cited
UNITED STATES PATENTS

| | | | |
|---|---|---|---|
| 3,218,220 | 11/1965 | Weber | 161/193 |
| 3,428,475 | 2/1969 | Teeg | 65/121 X |
| 3,597,305 | 8/1971 | Giffen | 161/193 X |
| 3,649,440 | 3/1972 | Megles | 161/193 X |
| 3,673,049 | 6/1972 | Giffen et al. | 65/121 X |
| 3,737,294 | 6/1973 | Dumbaugh et al. | 65/121 X |
| 3,746,526 | 7/1973 | Giffen | 65/121 |
| 3,778,335 | 12/1973 | Boyd | 161/193 X |

*Primary Examiner*—William J. Van Balen
*Attorney, Agent, or Firm*—Kees van der Sterre; Clinton S. Janes, Jr.; Clarence R. Patty, Jr.

[57] ABSTRACT

Subsurface-fortified glass laminates exhibiting improved breakage characteristics and increased resistance to delayed breakage are described. Such laminates have particular utility in the fabrication of glass tableware.

1 Claim, 2 Drawing Figures ized it ss3,958,052

SUBSURFACE-FORTIFIED GLASS LAMINATES

BACKGROUND OF THE INVENTION

Strong subsurface-fortified glass and glass-ceramic articles are known, being described in U.S. Pat. Nos. 3,746,526 and 3,597,305 to Giffen. Such articles are constructed of glass or glass-ceramic laminates comprising at least five distinct layers, and are formed by fusing together glass layers in a softened or molten condition to produce a laminated sheet and thereafter forming the laminated sheet while soft into an article of the desired configuration.

As in the case of three-layer laminated articles, such as described by Giffen et al in U.S. Pat. No. 3,673,049, subsurface-fortified articles comprise compressively-stressed glass surface layers fused to and substantially enveloping the core portions of the article, which compressively-stressed surface layers impart increased modulus of rupture strength thereto. In addition, however, subsurface-fortified articles comprise at least one compressively-stressed layer in the interior of the article near the surface thereof, which is intended to retard crack propagation from the surface into the interior of the article and thus reduce the incidence of breakage. Hence, even in cases where the surface compression layer of such an article is penetrated by a fracturing impact or abrasion, the subsurface compression layer can prevent the fracture from propagating to the central tensilely-stressed core portion to cause breakage, and the damaged article can continue to be used.

A preferred configuration for a subsurface-fortified glass or glass-ceramic laminate is a seven-layer configuration consisting of a tensilely-stressed central core portion, a pair of compressively-stressed subsurface fortifying layers fused to and substantially enveloping the central core portion, a pair of tensilely-stressed outer core layers fused to and substantially enveloping the core and subsurface compression layers, and a pair of compressively-stressed surface layers fused to and substantially enveloping the core, subsurface compression layers, and outer core layers. In a typical embodiment, the central core portion of the seven layer laminate is about 0.080 inches thick, each subsurface fortification layer is about 0.001 inch thick, each outer core layer is about 0.007 inch thick, and each surface is about 0.002 inch thick.

Three-layer glass laminates comprising high-expansion spontaneous opal core glasses of alkali aluminosilicate composition and low-expansion skin glasses of calcium aluminosilicate composition have been fabricated into lightweight glass plates, cups, bowls and the like according to the teachings of Giffen et al. in U.S. Pat. No. 3,673,049, to provide strong serviceable tableware. However, further improvements in the strength and durability of such laminated articles have been sought. It was anticipated that the fabrication of tableware from subsurface-fortified glass laminates might provide improvements in product durability, particularly with regard to reducing the incidence of delayed breakage, i.e., breakage occuring at some finite time after the introduction of surface flaws into the surface of the article. The subsurface fortification layer was expected to prevent breakage even in cases where flaw-induced fractures penetrated the surface compression layer and outer core of the fortified article, since breakage normally will not occur until a fracture reaches the tensilely-stressed central core portion of the article.

Initial attempts to produce subsurface-fortified laminated glassware from seven-layer laminates of conventional configuration were not successful. No improvements in serviceability over the commercial three-layer ware were obtained; rather, the resistance of the seven-layer ware to breakage at impact was reduced and the susceptibility to delayed breakage was apparently increased over the corresponding properties of the three-layer ware. These results were unexpected since the mere introduction of a subsurface fortifying layer into a three-layer laminate of otherwise conventional configuration and substantial strength should not have produced a laminated glass article of decreased strength in terms of resistance to breakage at impact.

Also, in addition to the problems of marginal strength and delayed breakage, the subsurface-fortified ware occasionally exhibited surprisingly high violence of breakage, i.e., breakage into a large number of small pieces of flying glass. This mode of breakage, termed "dicing" in the art, is not deemed a desirable mode of breakage for tableware.

Both delayed breakage and violence of breakage are understood to be largely dependent upon the tensile stresses and resulting total tensile strain energy in the core portions of the stressed laminated glass. Tensile stresses in these systems are proportional to the ratio of the total thickness of compressively-stressed layers to the total thickness of tensilely stressed layers. It was recognized that the introduction of compressively-stressed subsurface fortifying layers into commercial three-layer laminates would slightly increase tensile stresses in the core portions of the laminates; however, these increases were not deemed significant and could not account for the large increases in violence of breakage which were occasionally observed.

According to theory, reductions in tensile stress wich would reduce delayed breakage and violence of breakage could be obtained by decreasing the thickness of the compressively-stressed surface and subsurface fortifying layers in laminated articles of conventional configuration. However, reductions in surface layer thickness below about 0.002 inches are undesirable because of the lowered resistance to surface abrasion occasioned thereby, and reductions in subsurface fortifying layer thickness below about 0.0005 inches would present laminating problems and limit the effectiveness of this layer as a barrier to crack propagation.

Thus the problem presented was how to simultaneously increase the strength of the laminated system while eliminating the observed tendency toward delayed and violent breakage.

SUMMARY OF THE INVENTION

We have now discovered that the principal cause of the unexpected behavior of prior art subsurface-fortified laminated glass systems is an anomalous alkali ion migration from the alkali-containing core glass to the essentially alkali-free subsurface fortifying glass layer in the laminate. This migration occurs to an extent which cannot be explained on the basis of simple thermal diffusion, since microprobe analysis indicates that alkali levels in the subsurface fortifying layers of seven-layer laminates can in fact surpass alkali levels in the surrounding core glass. Thus the phenomenon essentially amounts to an "uphill" alkali ion migration, not yet fully understood.

The effect of this unexpectedly severe ion migration is to reduce, eliminate, or even reverse the thermal expansion mismatch between the core glass and the subsurface fortifying layer so that designed compressive stresses therein are eliminated and, occasionally, tensile stresses induced. The presence of a tensilely-stressed subsurface layer could explain the high violence of breakage, low impact resistance, and delayed breakage exhibited by conventional seven-layer ware.

The problem of anomalous alkali ion migration is expected to be encountered whenever spontaneous fluoride opal core glasses of alkali aluminosilicate composition are combined with calcium aluminosilicate surface layer glasses to produce subsurface fortified laminates. While the migration cannot yet be prevented in such systems, we have found that the thickness of the subsurface fortifying layer can be increased to a degree sufficient to insulate the central portions of the layer from the migration effect and thus to achieve design levels of compressive stress therein. Moreover, such fortifying layer thickness increases may be accomplished without undesirably increasing the tensile strain energy of the core portions of the article, so that both delayed breakage and violence of breakage may be controlled and even reduced.

Finally, our investigations have shown that delayed breakage may be further reduced by increasing the distance of the subsurface fortifying layer from the outer surface of the article. At conventional fortifying layer depths (0.007 inches or less) damage to the fortifying layer often occurs during the initial flaw-producing impact or abrasion and reduces the effectiveness of the layer as a barrier against crack propagation.

More specifically, we have found that, in the particular glass composition systems above described, fortifying layer thicknesses of at least 0.0015 inches and preferably about 0.002 inches should be maintained in order to achieve design levels of thermal expansion and thus residual compressive stress in at least the central portions of the subsurface fortifying layer. In addition, the fortifying layers should be spaced at least about 0.017 inches and preferably between about 0.017–0.025 inches below the outer surfaces of the glass laminate in order to provide adequate protection from fracture upon impact or abrasion in service.

Whereas increases in subsurface fortification layer thickness in these composition systems are helpful in counteracting the effects of alkali ion migration into the layer, excessive increases are not desirable because of the increases in tensile stress and tensile strain energy resulting therefrom. Hence the ratio of the combined thickness of the compressively-stressed portions of the laminte (the surface and subsurface fortification layers) to the combined thickness of the tensilely-stressed portions of the laminate (the core and outer core layers) in these systems does not exceed about 1:10 when the difference in thermal expansion between the compressively-stressed and tensilely-stressed layers is $15 \times 10^{-7}/°C$. or more at the setting point of the softest glass in the laminate.

Figure 1:
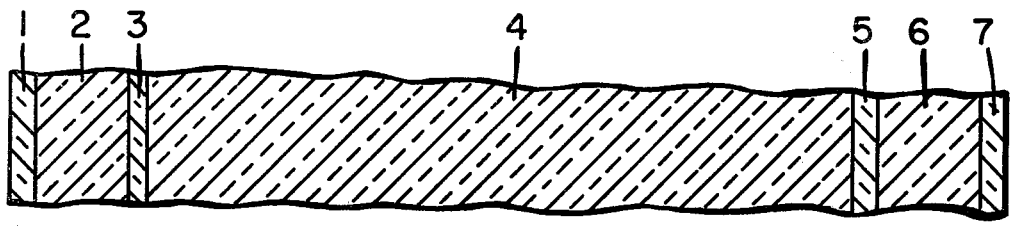
FIG. 1 of the drawing is an enlarged fragmentary view in cross section of a seven layer subsurface-fortified glass laminate consisting of an outer glass skin 1, a first outer core portion 2, a first subsurface fortifying layer 3, a central core 4, a second subsurface fortifying layer 5, a second outer core portion 6, and a final outer glass skin 7.
Figure 2:
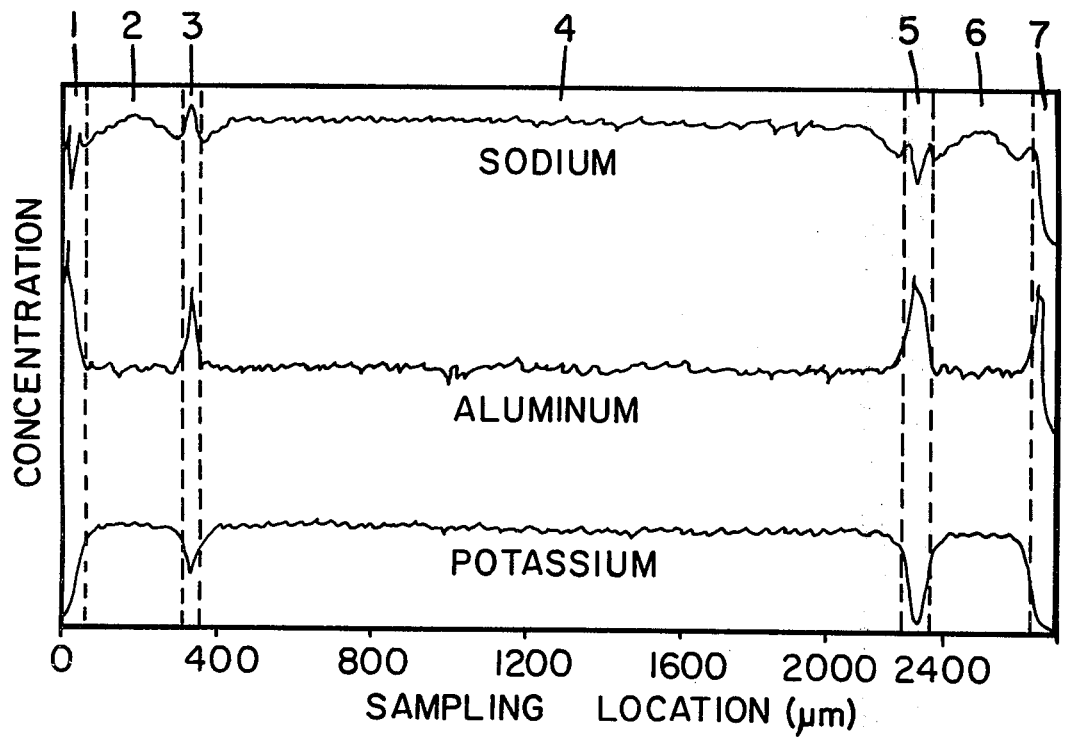
FIG. 2 of the drawing is a three-element concentration profile showing the amounts of sodium, potassium and aluminum present in a glass laminate having the structure shown in FIG. 1, as determined by scanning the cross-section with an electron microprobe. The horizontal trace denominated POTASSIUM is a step profile, at $2\mu m$ sampling intervals, of the relative potassium content observed in scanning across the thickness of the sample. The horizontal traces marked ALUMINUM and SODIUM are aluminum and sodium concentration profiles obtained by scanning for these elements across the same region of the sample laminate. The vertical scale of FIG. 2 represents concentration (relative) and the horizontal scale represents sampling location in the sample, expressed as distance from the first surface in microns ($\mu m$).

The broken vertical lines in FIG. 2 show the approximate locations of outer skin 1, outer core 2, subsurface fortifying layer 3, central core 4, subsurface fortifying layer 5, outer core 6, and outer skin 7 in the glass laminate being scanned. Those layers correspond approximately in location and thickness to layers 1–7 in the glass laminate of FIG. 1.

Referring to FIG. 2, both fortifying layer 3 and fortifying layer 5 are initially formed of the same low-expansion calcium aluminosilicate glass, that glass containing more aluminum and less potassium than the adjacent alkali aluminosilicate core glass and having a designed coefficient of thermal expansion at least $15 \times 10^{-7}/°C$. less than the core glass. The higher potassium content and lower aluminum content of the core glass as compared to the fortifying layer glass are clearly shown by the POTASSIUM and ALUMINUM concentration profiles set forth in FIG. 2.

The fortifying layer glass is intended to be substantially free of sodium, whereas the core glass has a target sodium oxide content of about 3% by weight. However, as is shown by the SODIUM concentration profile set forth in FIG. 2, whereas the sodium content of fortifying layer 5 is substantially less than the sodium content of the core glass, being at or near target levels at least in the central portions thereof, fortifying layer 3 has a relatively high sodium content which is found to exceed that of the surrounding core glass. Thus fortifying layer 3, being only about 0.0008 inches in thickness, contains about 4% sodium oxide by weight, has a coefficient of thermal expansion slightly greater than that of the surrounding core glass, and is found to be in tension rather than in compression. On the other hand, fortifying layer 5, being about 0.0022 inches in thickness, has at least a central portion which is low in sodium content, low in thermal expansion, and compressively stressed to an extend which is desirable in a subsurface-fortified glass laminate.

DETAILED DESCRIPTION

The core glasses of the subsurface-fortified laminates of the invention may be characterized as spontaneous fluoride opal glasses of alkali aluminosilicate composition. These core glasses, being relatively high in thermal expansion when compared to the surface or subsurface fortifying glasses, contain significant quantities of the alkali metal oxides $Na_2O$ and/or $K_2O$. As can be seen from the drawing, it is principally the migration of sodium ions from these core glasses into the subsurface fortifying layer which affects the properties of the resulting laminate. Typical core glass compositions include those consisting essentially, in weight percent on the oxide basis as calculated from the batch, of about 50–75% $SiO_2$, 3–20% $Al_2O_3$, 3–8% F, and 3–20% total of alkali metal oxides, including $Na_2O$, $K_2O$ and, optionally, some $Li_2O$, with $Na_2O$ comprising at least about one-third of the total alkali content and $K_2O$ not exceeding about 8% by weight of the composition.

In addition to these basic constituents, the core glasses may contain 0–20% total of alkaline earth metal oxides, preferably MgO and CaO, about 0–10% of oxides selected from the group consisting of $La_2O_3$, $TiO_2$, $ZrO_2$, $Nb_2O_5$, ZnO, CdO, $GeO_2$, PbO, $Bi_2O_3$, $CeO_2$, and $B_2O_3$, about 0–2% of fining agents such as $As_2O_3$ and $Sb_2O_3$, about 0–1.5% of chloride fining agents such as NaCl, KCl or $CaCl_2$, and about 0–5% of the oxides of transition metal colorants including Cr, Mn, Fe, Co, Cu, Nd, V and Ni.

The surface layer and subsurface fortifying layer glasses of the laminates of the invention may be characterized as calcium aluminosilicate glasses exhibiting coefficients of thermal expansion generally substantially lower than those of the core glasses. These glasses contain at most only minor amounts of $Na_2O$ or other alkali metal oxides; thus the migration of sodium ions from the core glasses into these compositions produces substantial changes in physical properties, most notably significant increases in thermal expansion.

Typical compositions for surface layer and subsurface fortifying layer calcium aluminosilicate glasses include compositions consisting essentially, in weight percent on the oxide basis as calculated from the batch, of about 50–65% $SiO_2$, 10–20% $Al_2O_3$, 5–25% CaO, 0–12% MgO, and 0–10% $B_2O_3$. Optionally, up to about 12% total of oxides selected from the group consisting of $Li_2O$, $Na_2O$, $K_2O$, $TiO_2$ and $ZrO_2$ may be included in these compositions to modify glass properties.

Anomalous sodium ion migration from the described alkali aluminosilicate core glasses to the described calcium aluminosilicate surface and subsurface fortifying layer glasses apparently occurs in the course of forming the glass laminates and shaping them into articles of the desired configuration, with lamination and forming typically being carried out at temperatures in excess of 1000°C. Based on our observations, sodium ion migration will probably occur to an objectionable extent in this composition system whenever the sodium oxide ($Na_2O$) content of the core glass equals or exceeds on a weight percent basis the sodium oxide content of the surface or subsurface fortifying layer glass. In that event, the subsurface fortifying layer should have a thickness of at last about 0.0015 inches and preferably about 0.002 inches in order that at least the central portion of the layer will retain its designed composition and thermal expansion characteristics.

In using subsurface-fortified laminates for the manufacture of strong, lightweight articles such as dinnerware, laminates which are as thin and light as possible consistent with the strength requirements for the application are employed. For dinnerware applications, total laminate thicknesses generally do not exceed about 0.150 inches and are typically in the range from about 0.100–0.110 inches. Control over tensile strain energy and violence of breakage in thin laminates of this type requires close control of surface and subsurface fortification layer thickness. We have found that, in subsurface fortified laminates composed of the core and skin glasses such as above described, wherein the total laminate thickness does not exceed about 0.150 inches, the thickness of the subsurface fortification layer should not exceed about 0.0025 inches if the desired resistance to delayed breakage and low violence of breakage are to be achieved. However, for laminates of typical thickness (0.100–0.110 inches) having conventional surface layers of about 0.002 inches thickness, control of subsurface fortification layer thickness to between about 0.0015–0.0025 inches can provide laminates exhibiting breakage characteristics less violent and more desirable than even annealed glass.

We have also discovered that the poor delayed breakage characteristics of lightweight dinnerware formed from subsurface-fortified laminates of conventional configuration is at least partially attributable to damage sustained by the subsurface fortification layer in the course of service-related impact or abrasion. Further investigation has revealed that fracture defects induced by abrasion or impact in service range from about 0.017–0.025 inches in depth. It is therefore desirable that the outer surface of the subsurface fortification layer be spaced at least about 0.017 inches and preferably about 0.025 inches from the outer surface of the laminate if fracture damage to the layer is to be avoided in service.

The following examples illustrate the criticality of subsurface fortification layer thickness and location on the impact resistance, delayed breakage resistance, and violence of breakage characteristics of lightweight laminated glass articles.

EXAMPLE 1

Three separate sheets of an alkali aluminosilicate core glass are formed, having a composition, in weight percent on the oxide basis as calculated from the batch, of about 63.5% $SiO_2$, 3.0% $K_2O$, 3.0% $Na_2O$, 15.0% CaO, 6.2% $Al_2O_3$, 1.2% MgO, 4.8% $B_2O_3$, and 3.3% F. Four separate sheets of a calcium aluminosilicate surface layer glass are also formed, having a composition, in weight percent on the oxide basis as calculated from the batch, of about 58.2% $SiO_2$, 15.0% CaO, 14.8% $Al_2O_3$, 5.7% MgO and 6.3% $B_2O_3$. The thermal expansion of the core glass is about $70 \times 10^{-7}/°C$. and the thermal expansion of the surface layer glass is about $49 \times 10^{-7}/°C$.

The seven sheets of glass thus formed are laminated together at a temperature of about 1300°C. to form a seven-layer laminate comprising an alkali aluminosilicate central core portion about 0.088 inches in thickness, two calcium aluminosilicate subsurface fortifying layers, each about 0.001 inches thick, fused to and substantially enveloping the central core portion, two alkali aluminosilicate outer core portions, each about 0.003 inches thick, fused to and substantially enveloping the central core portion and subsurface fortifying layers, and two calcium aluminosilicate surface layers, each about 0.002 inches thick, fused to and substantially enveloping the outer core portions, subsurface fortifying layers and central core portion of the laminate. The seven-layer laminated sheet thus prepared is then formed into a multiplicity of cups by sagging the sheet into cup molds, trimming, removing from the molds, fire polishing, and cooling.

Cups prepared as described are then tested for resistance to impact breakage and resistance to delayed breakage. Resistance to impact breakage is determined by subjecting the flat bottom area of each of a small group of cups to point impacts at a known impact energy. Successive groups of cups are impacted at increasing impact energies until a significant level of breakage in a group occurs.

Resistance to delayed breakage is determined by subjecting the survivors of a group of cups subjected to impact testing to repeated thermal upshock from 0° to 100°C., noting the level of initial impact damage required to induce a significant level of delayed breakage in the group of survivors under the subsequent thermal shock conditions described.

Typical results of impact resistance and delayed breakage testing for cups produced in accordance with Example 1 are set forth in Table I below. Included are an identification number for each group of cups tested (consisting of six cups unless otherwise noted), the impact energy in inch-pounds to which the cups in each group were subjected, the incidence of breakage at impact in the group at the impact energy level shown, and the incidence of delayed breakage among the survivors of impact testing induced by thermal upshock as hereinabove described. Breakage of a cup occuring subsequent to impact but prior to thermal shock testing is included under the heading of delayed breakage.

TABLE I

| Group Number | Impact Energy (in-lbs.) | Impact Breakage | Delayed Breakage |
| --- | --- | --- | --- |
| 1 | 0.04 | 0 | 1/6 |
| 2 | 0.06 | 0 | 2/6 |
| 3 | 0.08 | 0 | 0/6 |
| 4 | 0.08 | 0 | 3/6 |
| 5 | 0.08 | 1/6 | 4/6 |
| 6 | 0.11 | 3/6 | 2/6 |
| 7 | 0.11 | 0 | 4/6 |
| 8 | 0.11 | 1/6 | 2/6 |
| 9 | 0.12 | 2/6 | 1/6 |
| 10 | 0.15 | 2/4 | 2/4 |
| 11 | 0.16 | 1/6 | 4/6 |

The above data suggests that a significant level of impact breakage of the ware described in Example 1 would be expected at impact energies of 0.11 inch-pounds or more, and significant delayed breakage after impact damage at 0.04 inch-pounds.

EXAMPLE 2

Three separate sheets of an alkali aluminosilicate core glass are formed, the glass having a composition and coefficient of thermal expansion equivalent to the core glass of Example 1. Four separate sheets of a calcium aluminosilicate surface layer glass are also formed, having a composition and coefficient of thermal expansion equivalent to the surface layer glass of Example 1.

The seven sheets of glass thus formed are laminated together at a temperature of about 1300°C. to form a seven-layer laminate comprising an alkali aluminosilicate central core portion about 0.047 inches in thickness, two calcium aluminosilicate subsurface fortifying layers, each about 0.002 inches in thickness, fused to and substantially enveloping the central core portion, two alkali aluminosilicate outer core portions, each about 0.025 inches in thickness, fused to and substantially enveloping the central core portion and subsurface fortifying layers, and two clacium aluminosilicate surface layers, each about 0.002 inches thick, fused to and substantially enveloping the outer core portions, subsurface fortifying layers and central core portion of the article. The seven-layer laminated sheet thus prepared is then formed into a multiplicity of small bowls by sagging the sheet into molds, trimming, removing from the molds, fire polishing, and cooling.

Bowls prepared as described are tested for resistance to impact breakage, resistance to delayed breakage, and violence of breakage in accordance with the procedures described above in Example 1.

Typical results of impact resistance and delayed breakage testing are set forth in Table II below, including a group identification number, the impact energy in inch-pounds to which the members of the group were subjected, the incidence of breakage at impact in each group, and the incidence of delayed breakage among the survivors of impact testing, induced by thermal upshock as hereinabove described. All groups consisted of six bowls except Groups 1, 5 and 6 which contained 26 bowls and Group 9 which contained 5 bowls.

TABLE II

| Group Number | Impact Energy (in-lbs.) | Impact Breakage | Delayed Breakage |
| --- | --- | --- | --- |
| 1 | 0.10 | 0 | 0 |
| 2 | 0.10 | 0 | 0 |
| 3 | 0.12 | 0 | 0 |
| 4 | 0.15 | 0 | 0 |
| 5 | 0.20 | 1 | 0 |
| 6 | 0.30 | 0 | 0 |
| 7 | 0.40 | 0 | 0 |
| 8 | 0.40 | 0 | 0 |
| 9 | 0.50 | 0 | 0 |

Failure analysis of the single bowl in Group 5 which failed on impact at an impact energy of 0.20 inch-pounds indicated that impact-induced fracture damage extended to a depth of about 0.035 inch, penetrating the subsurface fortifying layer and reaching the tensilely-stressed core portion of the article.

It is apparent from a review of the data set forth in Tables I and II above that the subsurface-fortified laminates of the invention exhibit substantially improved resistance to impact breakage and delayed breakage when compared with prior art subsurface-fortified laminates. Hence, whereas prior art laminates shown a significant incidence of impact breakage at impact energies as low as 0.11 inch-pounds, the laminates of the invention show no significant breakage at impact energies up to 0.50 inch-pounds. Moreover, prior art laminates exhibit significant levels of delayed breakage after initial impact damage at energies as low as 0.04 inch-pounds, whereas the laminates of the invention exhibit no delayed breakage under equivalent conditions even after impact damage at the 0.50 inch-pounds energy level.

The violence of breakage of glass laminates produced according to the invention may be compared with the breakage violence of prior art subsurface-fortified laminates by comparing the number of pieces of glass produced upon low energy breakage of tableware produced therefrom, and by comparing the range of flying glass fragments generated upon high-energy impact failure of such ware. The number of pieces of glass produced upon failure of a glass article induced by a centerpunch impact is roughly proportional to the stored tensile strain energy of the ware. Eighteen-ounce bowls formed of subsurface-fortified laminated glass such as described above in Example 1 typically produce 6–10 pieces of glass upon centerpunch fracture, as compared with about 5–6 pieces for commercial three-layer ware. In contrast, eighteen-ounce bowls produced in the identical manner from subsurface-fortified laminated glass according to the invention, such as described above in Example II, typically produce 2–3 pieces upon centerpunch failure. This mode of breakage is comparable to that exhibited by non-laminated annealed (stress-free) glass.

The above data is in agreement with the results of drop tests conducted upon similar laminated glass articles wherein violence of breakage is correlated with the range of travel of glass fragments produced upon relatively high-energy dropping impact brakage. When dropped onto a hardwood base from a height of sixty inches, fragments from breaking eighteen-ounce bowls produced from subsurface-fortified laminated glass such as described above in Example I have a maximum range of about 12–18 feet, whereas fragments from eighteen-ounce bowls produced in the identical manner from subsurface-fortified laminated glass according to the invention, such as described above in Example II, have a maximum range of about 6 feet.

In fact, drop test data now indicate that glassware produced in accordance with the present invention exhibits a mode of breakage even less violent than unlaminated annealed glass. Thus unlaminated annealed eighteen-ounce bowls formed entirely of an alkali aluminosilicate glass such as the core glass of Examples I and II, when broken according to the drop testing procedure above described, produce fragments having a maximum range of up to 12 feet, as compared with 6 feet for our improved laminated bowls. It is both totally unexpected and highly desirable that stressed glass articles produced according to the present invention demonstrate less violent breakage than even non-laminated, stress-free glass articles of the kind still commonly used as tableware.

From the above data, the superior impact resistance, delayed breakage resistance, and breakage characteristics of subsurface-fortified laminates produced in accordance with the present invention are readily apparent. We have therefore concluded that the use of our laminates for the manufacture of strong, lightweight glass tableware or other glass articles provides significant advantages over the use of prior art subsurface-fortified laminates or non-laminated glass for these purposes.

We claim:

1. In a subsurface-fortified glass laminate having a thickness in the range of about 0.100–0.150 inches comprising a tensilely-stressed central core portion, a pair of compressively-stressed subsurface fortifying layers fused to and substantially enveloping said central core portion, a pair of tensilely-stressed outer core layers fused to and substantially enveloping said subsurface fortifying layers and central core portion, and a pair of compressively-stressed surface layers fused to and substantially enveloping said outer core layers, subsurface fortifying layers, and central core portion, wherein
   a. the tensilely-stressed central core portion and outer core layers are composed of a glass having a composition consisting essentially, in weight percent on the oxide basis as calculated from the batch, of about 50–75% $SiO_2$, 3–20% $Al_2O_3$, 3–8% F, and 3–20% total of alkali metal oxides selected from the group consisting of $Na_2O$, $K_2O$ and $Li_2O$, said $Na_2O$ comprising at least about one third of said total of alkali metal oxides and said $K_2O$ not exceeding about 8% of said composition;
   b. the compressively-stressed subsurface fortifying layers and surface layers are composed of a glass having a coefficient of thermal expansion at least about $15 \times 10^{-7}/°C$. less than that of the selected core glass and a composition consisting essentially, in weight percent on the oxide basis as calculated from the batch, of about 50–65% $SiO_2$, 10–20% $Al_2O_3$, 5–25% CaO, 0–12% MgO, 0–10% $B_2O_3$, and 0–12% total of oxides selected from the group consisting of $Li_2O$, $Na_2O$, $K_2O$, $TiO_2$ and $ZrO_2$; and wherein
   c. the tensilely-stressed central core portion and outer core layers have a sodium oxide content equal to or exceeding on a weight percent basis the sodium oxide content of the subsurface fortifying layers;

the improvements which comprise:
   i. maintaining the compressively-stressed subsurface fortifying layers at a thickness in the range of about 0.0015–0.0025 inches; and
   ii. spacing the compressively-stressed subsurface fortifying layers a distance of at least about 0.017 inches from the outer surfaces of the glass laminate.

* * * * *